United States Patent
Huang et al.

(10) Patent No.: US 10,815,339 B2
(45) Date of Patent: Oct. 27, 2020

(54) METHOD FOR PREPARING ORGANOPOLYSILOXANE RESINS

(71) Applicant: GUANGDONG BIOMAX SI&F NEW MATERIAL CO., LTD., Guangzhou (CN)

(72) Inventors: Zhenhong Huang, Guangzhou (CN); Xianhui Chen, Guangzhou (CN); Jinshu Wu, Guangzhou (CN); Huan Ji, Guangzhou (CN); Runming Liu, Guangzhou (CN)

(73) Assignee: GUANGDONG BIOMAX SI&F NEW MATERIAL CO., LTD., Guangzhou (CN)

( * ) Notice: Subject to any disclaimer, the term of this patent is extended or adjusted under 35 U.S.C. 154(b) by 11 days.

(21) Appl. No.: 16/096,700

(22) PCT Filed: Nov. 29, 2016

(86) PCT No.: PCT/CN2016/107621
§ 371 (c)(1),
(2) Date: Oct. 26, 2018

(87) PCT Pub. No.: WO2017/185737
PCT Pub. Date: Nov. 2, 2017

(65) Prior Publication Data
US 2019/0153169 A1    May 23, 2019

(30) Foreign Application Priority Data
Apr. 26, 2016  (CN) .......... 2016 1 0266019

(51) Int. Cl.
| C08G 77/00 | (2006.01) |
| C08G 77/06 | (2006.01) |
| C08G 77/18 | (2006.01) |
| C08G 77/28 | (2006.01) |
| C08G 77/08 | (2006.01) |
| C08G 77/34 | (2006.01) |

(52) U.S. Cl.
CPC ............. C08G 77/70 (2013.01); C08G 77/06 (2013.01); C08G 77/08 (2013.01); C08G 77/18 (2013.01); C08G 77/28 (2013.01); C08G 77/34 (2013.01)

(58) Field of Classification Search
CPC ........ C08G 77/70; C08G 77/34; C08G 77/06; C08G 77/18
See application file for complete search history.

(56) References Cited

U.S. PATENT DOCUMENTS

| 3,062,782 A * | 11/1962 | Tapas .................. C08F 16/12 526/283 |
| 5,391,673 A * | 2/1995 | Ekeland ............... C08G 77/04 528/12 |
| 5,767,216 A * | 6/1998 | Frances ............... C08G 77/06 528/17 |
| 2001/0034407 A1* | 10/2001 | Ariyasu ............... B32B 27/08 525/57 |
| 2006/0222615 A1* | 10/2006 | Kuroda ................ A61K 8/585 424/70.12 |
| 2010/0022705 A1 | 1/2010 | Amemiya et al. |
| 2011/0091693 A1* | 4/2011 | Okamoto ............. C08L 83/06 428/174 |

FOREIGN PATENT DOCUMENTS

| CN | 101460543 A | 6/2009 |
| CN | 101899157 A | 12/2010 |
| CN | 102898649 A | 1/2013 |
| CN | 103232600 A | 8/2013 |
| CN | 103242532 A | 8/2013 |
| CN | 103570947 A | 2/2014 |
| CN | 104151555 A | 11/2014 |
| CN | 104231271 A | 12/2014 |
| CN | 105906810 A | 8/2016 |

* cited by examiner

Primary Examiner — Kuo Liang Peng
(74) Attorney, Agent, or Firm — Bayramoglu Law Offices LLC

(57) ABSTRACT

A method for preparing organopolysiloxane resins, including the steps below: (1) using an alkoxysilane, a capping agent and an acidic compound as raw materials; (2) mixing all the raw materials uniformly, and the capping agent, the alkoxysilane and the acidic compound have a mole ratio from 0 to 40:1:0.2 to 5; (3) performing a polycondensation reaction at a temperature of 40-150° C. in 2-20 h; (4) adjusting the reaction product to neutral, and obtaining a product of organopolysiloxane resin after purification. Preparation of organopolysiloxane resins with the present application method has benefits on less environmental pollution, low energy consumption, efficient productivity, high yield of silicone resin with excellent performance.

18 Claims, 1 Drawing Sheet

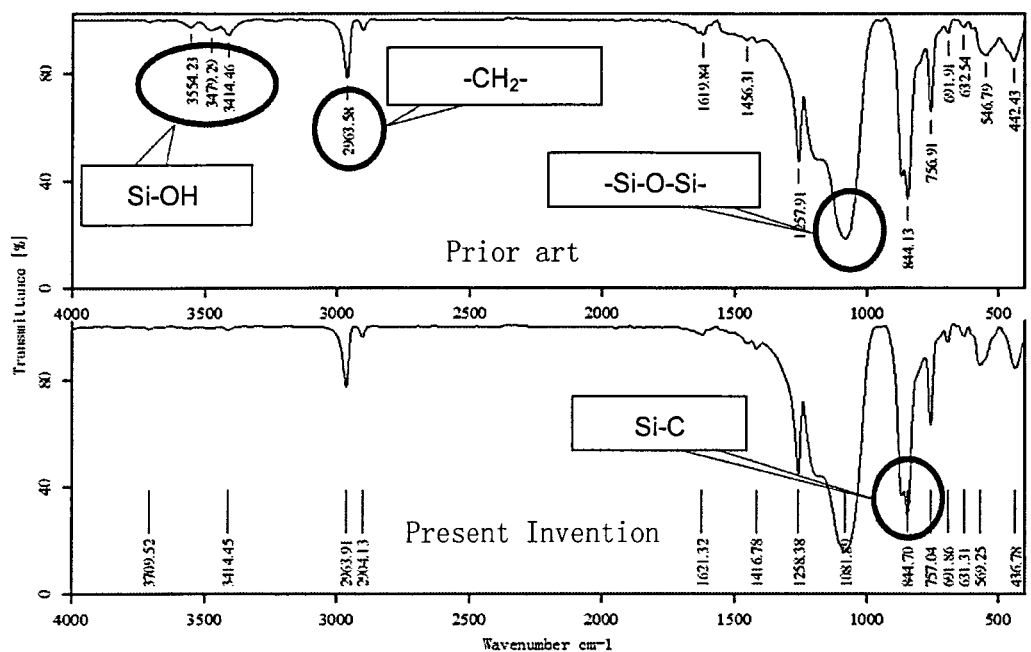

METHOD FOR PREPARING ORGANOPOLYSILOXANE RESINS

CROSS REFERENCE TO RELATED APPLICATIONS

This application is the national phase entry of International Application No. PCT/CN2016/107621, filed on Nov. 29, 2016, which is based upon and claims priority to Chinese Patent Application No. 201610266019.X filed with the Chinese Patent Office on 26 Apr. 2016, the entire contents of which are incorporated herein by reference.

TECHNICAL FIELD

The present application relates to the field of polymer synthesis, and particularly to a method for preparing organopolysiloxane resins.

BACKGROUND

Organopolysiloxane is a new type of silicone polymer material, composed of Si—O—Si backbone and functional group connected on the silicon atom. It has characteristic like smoothness, high temperature resistance, hydrophobicity, insulation etc., and widely used in many fields as electricity, electronics, construction, industrial chemicals, personal care, medical and other accessories. It includes silicone oil, silicone rubber, silicone resin and modified derivative of the above three.

Structure of organopolysiloxane resin can be classified into four units: monofunctional unit ($R_3SiO_{0.5}$, referred to as M unit), difunctional unit ($R_2SiO$, referred to as D unit), trifunctional unit ($RSiO_{1.5}$, referred to as T unit) and tetrafunctional units ($SiO_2$, referred to as Q unit). It is generally believed that organopolysiloxane containing T unit or Q unit is called organopolysiloxane resin.

Organopolysiloxane resin has a highly crosslinked structure which is cage-like, dendritic, branched or ladder. The general formula $R_nSiO_{(4-n)/2}$, where, $0 \leq n < 4$, R is the same or different organic group. In the crosslinking system, the typical structure of organopolysiloxane resin is shown below.

Organopolysiloxane resins may be transparent liquid, or powder solid. Because of their special structure, they have excellent heat resistance, low temperature resistance, film-forming property, flexibility, water resistance and adhesive effect, etc., are widely used in pressure-sensitive adhesive, liquid silicone rubber, LED encapsulating resin, anti-sticking isolation, mold release agent, waterproofing agent, personal care ingredient. At present, three main routes to prepare organopolysiloxane resins are presented as below.

1. Chlorosilane Hydrolysis

At the beginning, most organopolysiloxane resins are synthesized from chlorosilanes (eg, $MeSiCl_3$, $Me_2SiCl_2$, $MePhSiCl_2$, $Ph_2SiCl_2$, $PhSiCl_3$), via hydrolysis, condensation, organic solvent extraction and then concentration. Performance of the resin depends on the type and proportion of the raw material silane, pH of the hydrolysis and condensation reaction, property and amount of solvent, catalysts characteristic and process conditions. At present, many organosilicone companies and research institutes have conducted a lot of research in chlorosilane hydrolysis and applied for patents. For example, the Institute of Petroleum Chemistry Heilongjiang Provincial Academy of Sciences filed a patent "one method for preparation of phenyl vinyl silicone resin" (Chinese invention patent, CN104151555A), disclosing a method for preparing silicone resin, which conduct hydrolysis in toluene by control the feed of chlorosilane and the reaction temperature to reduce the reactivity difference between the raw materials, and further reflux condensation to obtain a resin with refractive index $\geq 1.50$, light transmittance $\geq 90\%$, viscosity $\geq 7000$ mPa·s, silanol content $\leq 1000$ ppm. Luzhou North chemical industry Co., Ltd. applied a patent "liquid silicone resin and preparation method and application" (Chinese invention patent, CN104231271A), disclosing condensation reaction of mixed monomer by dropwise addition of concentrated hydrochloric acid at a low temperature, to prepare silanol pre-polymer and purified liquid silicone resin.

2. Sodium Silicate Hydrolysis and Condensation (Sol-Gel) Method

Sol-gel is commonly used method to synthesize MQ silicone resin. First acidified aqueous solution of sodium silicate, followed by acid catalyzed condensation reaction,

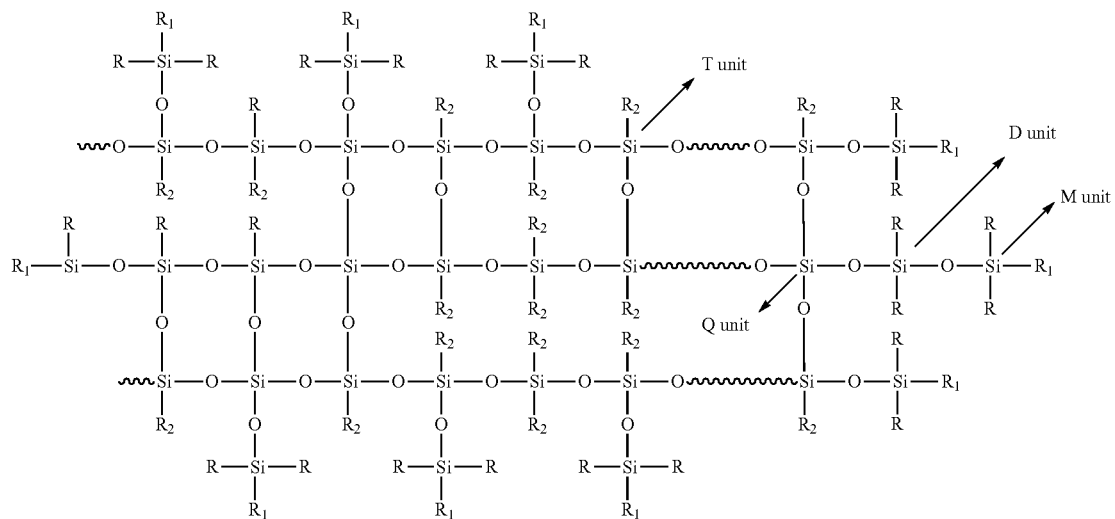

and then adding monofunctional M units capped, and finally wash the product with water and obtain the MQ silicone resin. At present, lots of researches have been conducted in Sol-gel method to prepare MQ silicone resin. For example, Bluestar Silicones French company filed a patent, "Synthetic routes to prepare MQ silicone resin" (Chinese invention patent, CN101460543A), disclosing a method for preparing MQ silicone resin, which can better control the condensation reaction of sodium silicate to form a silicon dioxide hydrosol in an aqueous medium and in the presence of acid. Nanchang University filed a patent "A method for preparing MQ silicone resin" (Chinese invention patent, CN101899157A), disclosing a method using tetrafunctional silicone monomer and a capping agent as raw materials, catalyzed by super acid solid, to prepare liquid or solid MQ silicone resin via hydrolysis and condensation.

3. Silicate Hydrolysis and Condensation Method

Since hydrochloric acid and sodium silicate react too quickly, people prefer to use alkyl silicate as raw material, i.e., silicates. First, silicate hydrolyzes and turns into silicic acid under acid or base catalyst, then condenses, monofunctional monomer is added to cap the resin. Lots of researches in Silicate hydrolysis and condensation method have been reported. For example, Shenzhen City of New Asia New Materials Co., Ltd. filed a patent "An environmentally friendly solvent-free method to prepare liquid silicone resin" (Chinese invention patent, CN1032412532A), disclosing an environmentally friendly solvent-free method to prepare liquid silicone resin with an excess of a capping agent hexamethyldioxane as a solvent to hydrolyze under acid condition, and condense under base condition. Another patent applied by the Dow Corning Corporation "Method of preparing a silicone resin" (US patents, WO2007US13836 20070613), disclosing a method using an alkoxysilane as raw material, acid hydrolysis condensation method to prepare a silicone resin.

Above three methods to prepare organopolysiloxane resin are all involved in hydrolysis and condensation route, which are with complex and long processing cycle, environmental unfriendly, easy gelation, low yield, poor reproducibility, high energy consumption and other shortcomings.

SUMMARY

The present application provides a method for preparing organopolysiloxane resins, including a solvent free, one-step process without adding in water, to reduce the disadvantages of the traditional methods for preparing organopolysiloxane resins as mentioned above.

A method for preparing organopolysiloxane resins comprises the steps of below:

(1) using alkoxysilane, capping agent and an acidic compound as raw materials;

(2) mixing all the raw materials till uniform, herein capping agent, alkoxysilane and acidic compound have a mole ratio from 0 to 40:1:0.2 to 5;

(3) performing polycondensation reaction at a temperature of 40-150° C. in 2-20 h;

(4) adjusting the reaction product to neutral, and obtaining a product of organopolysiloxane resin after purification.

In particular, the alkoxysilane contains at least one of Q unit, D unit and T unit, the capping agent contains M unit.

Preferably the molar ratio of M unit and sum of Q unit, T units and D unit is 0-40:1.

Alternatively, the alkoxysilane includes but not limited to methyl orthosilicate, ethyl orthosilicate, methyl polysilicate ester, ethyl polysilicate, methyl trimethoxysilane, methyl triethoxysilane, ethyl trimethoxysilane, ethyl triethoxysilane, trimethoxysilane, propyl triethoxysilane, cyclohexyltrimethoxysilane, cyclohexyltriethoxysilane, trimethoxysilane, triethoxysilane, vinyltrimethoxysilane, vinyltriethoxysilane, allyltrimethoxysilane, allyl triethoxysilane, phenyl trimethoxysilane, phenyl triethoxysilane, dimethyl dimethoxy silane, dimethyl diethoxysilane, methyl ethyl dimethoxysilane, methyl ethyl diethoxysilane, propyl methyl dimethoxy silane, propyl methyl diethoxysilane, methyl dimethoxy silane, methyl diethoxysilane, allyl methyl dimethoxy silane, allyl methyl diethoxysilane, diphenyl dimethoxy silane, diphenyl diethoxysilane, methyl phenyl dimethoxy silane, methyl phenyl diethoxysilane, acryloxytrimethoxysilane, acryloxy propyl triethoxysilane, methacryloxy propyl dimethoxysilane, methacryloxy propyl diethoxysilane, C4-C20 alkyl trimethoxysilane, C4-C20 alkyl triethoxysilane, γ-chloropropyltrimethoxysilane, γ-chloropropyltriethoxysilane, mercapto propyl trimethoxysilane, mercapto propyl triethoxysilane, one or several of the above silanes.

Further, the capping agent includes but not limited to 1, 1, 1, 3, 3, 3-hexamethyl disiloxane, 1, 1, 3, 3-tetramethyl disiloxane, 1, 1, 3, 3-tetramethyl-1, 3-divinyldisiloxane, 1, 1, 3, 3 tetramethyl 1, 3-diphenyl disiloxane, 1, 3-dimethyl-1, 1, 3, 3-tetraphenyldisiloxane, 1, 1, 1, 3, 3, 3, 5, 5, 7, 7, 7-decamethyltetrasiloxane, 1, 1, 3, 3, 3-pentamethyl disiloxane, 1, 1, 1, 3, 5, 5, 5 heptamethyltrisiloxane, one or several of the above.

Alternatively, the method for preparing organopolysiloxane resins, wherein capping agent is a silane containing a single chlorine/alkoxy groups, including but not limited to trimethylsilyl chloride, trimethylmethoxysilane, trimethylethoxysilane, dimethyl vinyl chlorosilane, vinyl dimethyl methoxysilane, vinyl dimethyl ethoxysilane, dimethylchlorosilane, one or several of the above silanes.

Furthermore, the acidic compound includes an acidic compound I containing carboxyl groups, wherein the molar ratio of carboxyl group and alkoxy group contained in alkoxysilane is 0.2-5:1.

In particular, the acidic compound I includes but not limited to formic acid, acetic acid, propionic acid, butyric acid, valeric acid, oxalic acid, benzoic acid, C6-C26 monocarboxylic acid, succinic acid, adipic acid, phthalic acid, one or several of the above.

The alkoxy groups include but not limited to methoxy, ethoxy, n-propoxy, isopropoxy, n-butoxy or isobutoxy. Alternatively, the alkoxy groups include but not limited to ethylene glycol monomethyl ether or ethylene glycol monoethyl ether.

Further, the acidic compound herein comprises an acidic compound II, the amount of acidic compound II of the total raw materials is 0.1-5 wt %.

In particular, the acidic compound II includes but not limited to one or a mixture of at least part of: sulfuric acid, hydrochloric acid, phosphoric acid, trifluoromethane sulfonic acid, p-toluenesulfonic acid, ferric chloride, aluminum chloride, zinc chloride, titanium tetrachloride, tin dichloride, solid super acid, acid clay, cation exchange resin.

Further, the acidic compound comprises an acidic compound III, the amount of acidic compound III of the acidic compound II is 1-50 wt %.

In particular, the compound III includes but is not limited to one or a mixture of at least part of: acetic anhydride, succinic anhydride, phthalic anhydride, phosphorus pentoxide, organic acid chloride.

Furthermore, step (2) requires a mixing of the raw material in 30-60 mins.

Step (4), applies an aqueous solution of alkaline compound to adjust the reaction product to neutral, the alkaline compound includes but not limited to one or a mixture of at least part of: sodium hydroxide, potassium hydroxide, sodium carbonate, sodium bicarbonate, ethylene diamine, ethanolamines, triethylamine.

Furthermore, the purification process of the neutralized product of step (4) is as below:

(4.1) separating the oil phase, drying the oil phase out, filtrating, obtaining a mixture of organopolysiloxane resin and volatile components;

(4.2) organopolysiloxane resin is obtained after separating the volatile components by vacuum distillation.

Preferably, the vacuum distillation is carried out at a temperature of 100-160° C.

The structure of the resultant preparation organopolysiloxane resin is anyone of the unit composition as below: MQ type, MT type, DT type, MDT type, MTQ type, DTQ type, MDTQ type, $MD_xM$ Type.

Compared with the prior art, the present application has the following advantages:

(1) The starting material is prepared without adding in any extra organic solvent, so there are no large quantities of pollutants discharged.

(2) The process applies condensation in combination of various functional units, decreases energy consumption largely when compared with acid catalyzed hydrolysis and base catalyzed condensation process.

(3) The process takes one-step reaction, avoiding two-steps reaction including acid catalyzed hydrolysis and base catalyzed condensation, greatly shortens manufacturing time, and reduces labor intensity, thus facilitating the industrialization.

(4) The one-step reaction, requires a mild reaction condition, making it easy to control, avoids gelation frequently caused by rapid hydrolysis and condensation out of control, improves yield and repeatability of organopolysiloxane resin.

(5) Volatile by-products produced in the reaction are easy to separate and recycle by vacuum distillation consuming much lower energy, greatly reducing the volatile content of organopolysiloxane resin.

(6) Realize a yield of organopolysiloxane resin higher than 95%, with an average molecular weight from 2000 g/mol to 8000 g/mol, providing excellent film forming and reinforcing performance.

(7) The present application method for preparing organopolysiloxane resins can be applied in preparing organopolysiloxane resins with various structure compositions. Organopolysiloxane resins prepared with the present application method have wide applications in liquid silicone rubber, silicone pressure sensitive adhesive, LED encapsulating silicone rubber, lubricant and release agent additives and other personal care products.

BRIEF DESCRIPTION OF THE DRAWING

FIG. 1 is comparison of Infrared spectroscopy scan between the conventional method and the present application method for preparing MQ resin (M/Q=0.65).

DETAILED DESCRIPTION OF THE EMBODIMENTS

Embodiments of the present application are described in further detail.

The present application may be further illustrated in the following example embodiment, but examples are not limiting the scope of the present application.

Example 1

Amount of reactants are shown in Table 1, the reaction conditions are listed in Table 2, the silane monomer and type I acidic compound were added to the reactor and stirred for 15 minutes, then acidic compound class II and class III acidic compound were added to the mixture, after stirring for 30 minutes, react for (reaction time) at the (reaction temperature), the mixture was cooled down to room temperature, washed with aqueous sodium carbonate and separated, the upper layer was distillated under reduced pressure, to yield a polyorganosiloxane resin containing various functional groups, the results were shown in table 3 below.

TABLE 1

Formulation List of All Examples

| | | Example(Units Composition) | | | | |
|---|---|---|---|---|---|---|
| | | 1 | 2 | 3 | 4 | 5 |
| | Reagent | MT | HS-MT | Ph-MT | H-Ph-MT | Vi-Ph-MT |
| | $\gamma\text{-}HSC_3H_6Si(OEt)_3$ | | 142.8 | | | |
| | $EtSi(OEt)_3$ | 192.0 | | | | |
| | $PhSi(OEt)_3$ | | | 288.0 | 240.0 | |
| | $PhSi(OMe)_3$ | | | | | 267.3 |
| | $ViMe_2SiOSiMe_2Vi$ | | | | | 16.7 |
| | $HMe_2SiOSiMe_2H$ | | | | 33.5 | |
| | $Me_3SiOSiMe_3$ | 243.0 | 72.9 | 32.4 | | 21.9 |
| Acidic Compound I | Formic acid | | | | | 208.7 |
| | Acetic acid | 216.0 | 155.5 | | 198.0 | |
| | Propionic acid | | | 293.0 | | |
| Acid Compound II | Hydrochloric acid | 23.8 | | | 15.0 | |
| | Phosphoric acid | | | 5.1 | | 4.8 |
| | Trifluoromethane sulfonic acid | | 2.2 | | | |

TABLE 1-continued

Formulation List of All Examples

| Acid Compound III | Acetic anhydride | 6.0 | 0.5 | | 3.0 | 1.0 |
|---|---|---|---|---|---|---|
| | Succinic anhydride | | | 1.0 | | |
| Aqueous solution of Na$_2$CO$_3$, 7.5 wt % | | 140.4 | 385.7 | 414.5 | 445.0 | 361.1 |

| | | Example(Units Composition) | | | | |
|---|---|---|---|---|---|---|
| | Reagent | 6<br>MD | 7<br>MDT | 8<br>Ph-MDT | 9<br>H-Ph-MDT | 10<br>Vi-Ph-MDT |
| | MeSi(OEt)$_3$ | | 89.0 | | | |
| | PhSi(OEt)$_3$ | | | | | 252.0 |
| | PhSi(OMe)$_3$ | | | 326.7 | 198.0 | |
| | Me$_2$Si(OEt)$_2$ | | 37.0 | | | 25.9 |
| | Me$_2$Si(OMe)$_2$ | 335.0 | | 36.9 | 33.5 | |
| | ViMe$_2$SiOSiMe$_2$Vi | | | | | 32.6 |
| | HMe$_2$SiOSiMe$_2$H | | | | 33.5 | |
| | Me$_3$SiOSiMe$_3$ | 40.5 | 121.5 | 44.6 | | |
| Acidic Compound I | Formic acid | 241.5 | | 265.7 | 185.2 | |
| | Acetic acid | | 144.0 | | | 231.0 |
| Acid Compound II | Phosphoric acid | 5.9 | | | | |
| | Trifluoromethane sulfonic acid | | 2.5 | 6.4 | 2.7 | 3.1 |
| Acid Compound III | Acetic anhydride | 1.2 | 0.6 | | | 0.6 |
| | Succinic anhydride | | | 1.3 | 0.5 | |
| Aqueous solution of Na$_2$CO$_3$, 7.5 wt % | | 224.5 | 362.5 | 264.8 | 364.2 | 301.3 |

| | | Example(Units Composition) | | | | |
|---|---|---|---|---|---|---|
| | Reagent | 11<br>MQ-1 | 12<br>MQ-2 | 13<br>MQ-3 | 14<br>H-MQ | 15<br>Vi-MQ |
| | Si(OEt)$_4$ | 262.5 | 225.0 | 180.0 | 208.0 | 124.8 |
| | ViMe$_2$SiOSiMe$_2$Vi | | | | | 15.7 |
| | HMe$_2$SiOSiMe$_2$H | | | | 50.3 | |
| | Me$_3$SiOSiMe$_3$ | | 87.9 | 82.6 | 77.8 | 58.2 |
| Acidic Compound I | Acetic acid | 231.0 | 207.0 | 172.8 | 264.0 | 172.8 |
| | Hydrochloric acid | | | | | 10.9 |
| Acid Compound II | Phosphoric acid | | | 6.5 | | |
| | Trifluoromethane sulfonic acid | 3.5 | | | 2.6 | 2.6 |
| Acid Compound III | Acetic anhydride | 0.7 | 1.3 | 0.5 | | 1.6 |
| | Succinic anhydride | | | | 0.7 | |
| Aqueous solution of Na$_2$CO$_3$, 7.5 wt % | | 305.1 | 454.4 | 431.3 | 335.3 | 561.0 |

| | | Example(Units Composition) | | | | | |
|---|---|---|---|---|---|---|---|
| | Reagent | 16<br>MDQ | 17<br>Vi-MDQ | 18<br>MTQ | 19<br>Vi-MTQ | 20<br>MDTQ | 21<br>Vi-MDTQ |
| | Si(OEt)$_4$ | 112.5 | 150.0 | | | | |
| | Si(OMe)$_4$ | | | 150.0 | 124.8 | 76.0 | 91.2 |
| | MeSi(OMe)$_3$ | | | 77.0 | 27.7 | 38.5 | 27.7 |
| | Me$_2$Si(OEt)$_2$ | 55.5 | 74.0 | | | | |
| | Me$_2$Si(OMe)$_2$ | | | | | 30.0 | 36.0 |
| | ViMe$_2$SiOSiMe$_2$Vi | | 9.3 | | 11.2 | | 11.2 |
| | HMe$_2$SiOSiMe$_2$H | | | | | | |
| | Me$_3$SiOSiMe$_3$ | 45.6 | 56.7 | 60.8 | 29.2 | 28.4 | 29.2 |
| Acidic Compound I | Formic acid | | 165.6 | 193.2 | 162.3 | 179.4 | 179.1 |
| | Acetic acid | 162.0 | | | | | |
| Acid Compound II | Hydrochloric acid | | | | | | 10.7 |
| | Phosphoric acid | | 4.6 | 6.1 | | | |
| | Trifluoromethane sulfonic acid | 2.1 | | | 1.9 | 1.7 | |
| Acid Compound III | Acetic anhydride | 0.5 | | 0.5 | | | 1.6 |
| | Succinic anhydride | | 0.9 | 1.2 | | 0.4 | |
| Aqueous solution of Na$_2$CO$_3$, 7.5 wt % | | 401.7 | 452.8 | 538.1 | 516.8 | 438.9 | 362.2 |

TABLE 2

Process Specification List of All Examples

| Example(Units Composition) | Reaction Temperature/° C. | Reaction Time/hr | Vacuum Distillation Temperature/° C. |
|---|---|---|---|
| HS-MT | 65 | 3.5 | 120 |
| MDQ | 70 | 3.5 | 120 |
| MTQ | 60 | 5 | 100 |
| MDTQ | 65 | 4 | 100 |
| Vi-MQ | 60 | 4.5 | 120 |
| Vi-MDQ | 65 | 5 | 105 |
| Vi-MTQ | 60 | 5 | 100 |
| Vi-MDTQ | 64 | 6 | 100 |
| H-MQ | 72 | 3 | 120 |
| MT | 60 | 3 | 120 |
| MD | 60 | 3 | 100 |
| MDT | 60 | 3.5 | 120 |
| Ph-MT | 70 | 6 | 120 |
| Ph-MDT | 75 | 5 | 105 |
| H-Ph-MT | 65 | 8 | 120 |
| H-Ph-MDT | 70 | 5 | 100 |
| Vi-Ph-MT | 65 | 6 | 100 |
| Vi-Ph-MDT | 70 | 5 | 120 |
| MQ-1 | 70 | 5 | 120 |
| MQ-2 | 72 | 5 | 120 |
| MQ-3 | 70 | 5 | 120 |

TABLE 3

Results of All Examples

| Example | Yield/% | Volatile/% | $M_n$/ g·mol$^{-1}$ | $v^{25}$/ mPa·s | $n_D^{25}$ | $CH_2=CH$/ wt % | $(Si-H)H$/ wt % | $SH$/ mmol·g$^{-1}$ |
|---|---|---|---|---|---|---|---|---|
| HS-MT | 92.3 | 1.1 | | 20.0 | 1.4450 | | | 4.0 |
| MDQ | 97.6 | 0.3 | 1924.6 | | | | | |
| MTQ | 98.1 | 0.2 | 2037.5 | | | | | |
| MDTQ | 97.5 | 0.4 | 1986.3 | | | | | |
| Vi-MQ | 90.2 | 0.6 | 1265.0 | | | 3.8 | | |
| Vi-DQ | 93.9 | 0.4 | 2691.3 | | | 1.5 | | |
| Vi-MTQ | 95.2 | 0.7 | 2755.0 | | | 3.5 | | |
| Vi-MDTQ | 94.4 | 0.8 | 2887.3 | | | 2.7 | | |
| H-MQ | 98.9 | 0.2 | 2732.3 | | | | 0.6 | |
| MT | 98.0 | 1.1 | | 35.0 | | | | |
| MD | 96.2 | 1.4 | | 125.0 | | | | |
| MDT | 93.5 | 0.9 | | 35.0 | | | | |
| Ph-MT | 95.2 | 0.4 | 2237.6 | | 1.5435 | | | |
| Ph-MDT | 96.3 | 0.4 | 1195.3 | | 1.5310 | | | |
| H-Ph-MT | 97.7 | 0.8 | 2188.4 | | 1.5125 | | 0.3 | |
| H-Ph-MDT | 95.4 | 0.8 | 2084.4 | | 1.5020 | | 0.2 | |
| Vi-Ph-MT | 98.7 | 0.4 | 2258.7 | | 1.5478 | 2.2 | | |
| Vi-Ph-MDT | 97.7 | 0.4 | 2127.9 | | 1.5315 | 5.0 | | |
| MQ-1 | 98.6 | 0.1 | 4552.0 | | | | | |
| MQ-2 | 98.1 | 0.2 | 4775.0 | | | | | |
| MQ-3 | 97.9 | 0.5 | 3299.0 | | | | | |

Comparative Example 1 (MQ-4)

300 g ethyl polysilicate, 100.44 g hexamethyldisiloxane and 110.22 g toluene were added into a 1 L three-necked flask, stirred and added a mixture of 30 g alcohol and 10.97 g concentrated hydrochloric acid, stirred and added 220.44 g purified water by dropwise in about 65 mins, then the mixture was heated to 72° C. and reacted for 3 h. The resultant was extracted by adding 110.22 g toluene, separated. 22.04 g 5 wt % KOH aqueous solution was added to the organic layer and heated to 72° C. and reacted for 6 h. The resultant was neutralized, dried, filtrated and concentrated at 160° C. under reduced pressure to give 135.53 g products, with yield 61.48%, volatile content 0.68%, $M_n$ 3370 g/mol.

Comparative Example 2 (MQ-5)

300 g ethyl polysilicate, 100.44 g hexamethyldisiloxane and 150.08 g toluene were added into a 1 L three-necked flask, stirred and added a mixture of 30 g alcohol and 11.24 g concentrated hydrochloric acid, stirred and added 126.36 g purified water by dropwise in about 68 mins, then the mixture was heated to 72° C. and reacted for 3 h. The resultant was extracted by adding 150.08 g toluene, separated. 23.02 g 5 wt % KOH aqueous solution was added to the organic layer, heated to 72° C. and reacted for 6 h. The resultant was neutralized, dried, filtrated and concentrated at 160° C. under reduced pressure to give 156.81 g product, with yield 68.13%, volatile content 0.75%, $M_n$ 3022 g/mol.

Comparative Example 3 (MQ-6)

300 g ethyl polysilicate, 129.6 g hexamethyldisiloxane and 120 g toluene were added into a 1 L three-necked flask, stirred and added a mixture of 30 g alcohol and 11.77 g concentrated hydrochloric acid, stirred and added 129.6 g purified water by dropwise in about 72 mins, then the mixture was heated to 72° C. and reacted for 3 h. The resultant was extracted by adding 129.6 g toluene, separated. 24.96 g 5 wt % KOH aqueous solution was added to the organic layer and heated to 72° C. and reacted for 6 h. The resultant was neutralized, dried, filtrated and concentrated at 160° C. under reduced pressure to give 135.53 g products, with yield 83.00%, volatile content 0.78%, $M_n$ 2173 g/mol.

Comparison of Technical Specification between the present application method and the conventional method of synthesizing organopolysiloxane resin is shown in Table 4.

TABLE 4

Comparison of Technical Specification between the present invention method and the conventional method of synthesizing organopolysiloxane resins

|  | M/Q = 0.62 | | M/Q = 0.68 | | M/Q = 0.80 | |
| --- | --- | --- | --- | --- | --- | --- |
| Specification | MQ-1 | MQ-4 | MQ-2 | MQ-5 | MQ-3 | MQ-6 |
| Yieldt/% | 98.61% | 61.48% | 98.11% | 68.13% | 97.86% | 83.00% |
| Volatile Content/wt % | 0.12% | 0.68% | 0.21% | 0.75% | 0.54% | 0.78% |
| $M_n$ | 4552 | 3370 | 4775 | 3022 | 3299 | 2173 |

NOTE:
$M_n$ means number average molecular weight, in units of g/mol, is measured by GPC; testing condition of the volatile component is 150° C. × 3 h.

NOTE: $M_n$ means number average molecular weight, in units of g/mol, is measured by GPC. Testing condition of the volatile component is 150° C.×3 h.

From table 4 we can find that with the same M/Q ratio, the MQ resins prepared with the present application method has a higher yield of resin, less volatile and larger average molecular weight, when compared with MQ resins prepared with the traditional method.

With the same M/Q ratio of 0.62, the MQ resin prepared with the present application method, namely MQ-1, has a 98.61% yield of resin, 0.12 wt % volatile content, 4552 g/mol number average molecular weight, meanwhile, the MQ resin prepared with the traditional method, namely, MQ-4, has a 61.48% yield of resin, 0.68 wt % volatile content, 3370 g/mol number average molecular weight.

Infrared spectroscopy of MQ resin prepared respectively with the conventional methods and the present application method is shown in FIG. 1.

From the FIG. 1, it can be found: in a wavelength range of 500-3200 $cm^{-1}$, the infrared spectra of MQ resin prepared respectively with the conventional methods and the present application method has no significant difference in the characteristic absorption peak of Si—O—Si (1080 $cm^{-1}$), Si—$CH_3$ (1260 $cm^{-1}$), C—H (2960 $cm^{-1}$). We know the range of 3400-3700 $cm^{-1}$ absorption peak mainly reflects the residual of Si—OH group, and the residual of active Si—OH group would cause problems in shelf stability when applied in liquid silicone rubber and other products.

Within this M/Q ratio range, the MQ resin prepared with the present application method, has nearly none residual of Si—OH group, but the MQ resin prepared with the traditional method dose have a small residue of Si—OH group, which illustrates the advantage of the present application method compared with the traditional method, on disposing residual of Si—OH group.

In summary, compared with the prior art, the present application has great advantages, namely, solvent-free and environmental-friendly, one-step reaction and efficient process, high yield of MQ resin, low volatile content, having excellent performance in wide applications.

The embodiment of the present application described above is just a preferred embodiment, it is not just limited to the above embodiment, any other change, like modifications, substitutions, combinations, simplification, made in the present application does not depart from the spirit and principles, shall be equivalent replacement and included within the scope of the present application.

The invention claimed is:

1. A method for preparing organopolysiloxane resins, comprising the following steps:
   (1) using an alkoxysilane, a capping agent and an acidic compound as raw materials without adding water;
   (2) mixing all the raw materials uniformly, wherein the capping agent, the alkoxysilane and the acidic compound have a molar ratio from more than 0 to 40:1:0.2 to 5;
   (3) performing a polycondensation reaction at a temperature of 40-150° C. in 2-20 h to obtain a reaction product;
   (4) adjusting the reaction product to neutral, and obtaining a product of organopolysiloxane resin after purification;
   wherein the acidic compound comprises an acidic compound I containing a carboxyl group; and wherein a molar ratio of the carboxyl group to an alkoxy group contained in the alkoxysilane is 0.2-5:1.

2. The method for preparing organopolysiloxane resins of claim 1, wherein the alkoxysilane comprises at least one of Q unit, D unit or T unit; and the capping agent comprises a M unit.

3. The method for preparing organopolysiloxane resins of claim 2, wherein a molar ratio of the M unit and a sum of the Q unit, the T unit and the D unit is from more than 0 to 40:1.

4. The method for preparing organopolysiloxane resins of claim 2, wherein the alkoxysilane comprises one or more silanes selected from the group consisting of methyl orthosilicate, ethyl orthosilicate, methyl polysilicate ester, ethyl polysilicate, methyl trimethoxysilane, methyl triethoxysilane, ethyl trimethoxysilane, ethyl triethoxysilane, propyl triethoxysilane cyclohexyltrimethoxysilane, cyclohexyltriethoxysilane, triethoxysilane, vinyltrimethoxysilane, vinyltriethoxysilane, allyltrimethoxysilane, allyl triethoxysilane, phenyl trimethoxysilane, phenyl triethoxysilane, dimethyl dimethoxy silane, dimethyl diethoxysilane, methyl ethyl dimethoxysilane, methyl ethyl diethoxysilane, propyl methyl dimethoxy silane, propyl methyl diethoxysilane, methyl dimethoxy silane, methyl diethoxysilane, allyl methyl dimethoxy silane, allyl methyl diethoxysilane, diphenyl dimethoxy silane, diphenyl diethoxysilane, methyl phenyl dimethoxy silane, methyl phenyl diethoxysilane, acryloxytrimethoxysilane, acryloxy propyl triethoxysilane, methacryloxy propyl dimethoxysilane, methacryloxy propyl diethoxysilane, C4-C20 alkyl trimethoxysilane, C4-C20 alkyl triethoxysilane, γ-chloropropyltrimethoxysilane, γ-chloropropyltriethoxysilane, mercapto propyl trimethoxysilane, and mercapto propyl triethoxysilane.

5. The method for preparing organopolysiloxane resins of claim 2, wherein the capping agent comprises one or more selected from the group consisting of 1, 1, 1, 3, 3, 3-hexamethyl disilaxane, 1, 1, 3, 3-tetramethyl disiloxane, 1, 1, 3, 3-tetramethyl-1, 3-divinyldisiloxane, 1, 1, 3, 3 tetramethyl 1, 3-diphenyl disiloxane, 1, 3-dimethyl-1, 1, 3, 3-tetraphenyldisiloxane, 1, 1, 1, 3, 3, 3, 5, 5, 7, 7, 7-decamethyltetrasiloxane, 1, 1, 3, 3, 3-pentamethyl disiloxane, and 1, 1, 1, 3, 5, 5, 5 heptamethyltrisiloxane.

6. The method for preparing organopolysiloxane resins of claim 2, wherein the capping agent is a silane containing a single chlorine/alkoxy group; and wherein the silane comprises one or more selected from the group consisting of trimethylsilyl chloride, trimethylmethoxysilane, trimethylethoxysilane, dimethyl vinyl chlorosilane, vinyl dimethyl methoxysilane, vinyl dimethyl ethoxysilane, and dimethylchlorosilane.

7. The method for preparing organopolysiloxane resins of claim 1, wherein the acidic compound I comprises one or more selected from the group consisting of formic acid, acetic acid, propionic acid, butyric acid, valeric acid, oxalic acid, benzoic acid, C6-C26 monocarboxylic acid, succinic acid, adipic acid, and phthalic acid.

8. The method for preparing organopolysiloxane resins of claim 1, wherein the alkoxy group comprises methoxy, ethoxy, n-propoxy, isopropoxy, n-butoxy, and isobutoxy.

9. The method for preparing organopolysiloxane resins of claim 1, wherein the alkoxy group comprises ethylene glycol monomethyl ether and ethylene glycol monoethyl ether.

10. The method for preparing organopolysiloxane resins of claim 1, wherein the acidic compound further comprises an acidic compound II, an amount of the acidic compound II of total raw materials is 0.1-5 wt %.

11. The method for preparing organopolysiloxane resins of claim 10, wherein the acidic compound II comprises one or more selected from the group consisting of: sulfuric acid, hydrochloric acid, phosphoric acid, trifluoromethane sulfonic acid, p-toluenesulfonic acid, ferric chloride, aluminum chloride, zinc chloride, titanium tetrachloride, tin dichloride, solid super acid, acid clay, and cation exchange resin.

12. The method for preparing organopolysiloxane resins of claim 1, wherein the acidic compound further comprises an acidic compound III, an amount of the acidic compound III 1-50 wt % of an amount of the acidic compound II.

13. The method for preparing organopolysiloxane resins of claim 12, wherein the acidic compound III comprises one or more selected from the group consisting of: acetic anhydride, succinic anhydride, phthalic anhydride, phosphorus pentoxide, and organic acid chloride.

14. The method for preparing organopolysiloxane resins of claim 1, wherein the step (2) requires a mixing of the raw materials in 30-60 mins.

15. The method for preparing organopolysiloxane resins of claim 1, wherein the step (4), applies an aqueous solution of an alkaline compound to adjust the reaction product to neutral, the alkaline compound comprises one or more selected from the group consisting of: sodium hydroxide, potassium hydroxide, sodium carbonate, sodium bicarbonate, ethylene diamine, ethanolamines, and triethylamine.

16. The method for preparing organopolysiloxane resins of claim 1, wherein a purification process of a neutralized product of the step (4) is as below:
(4.1) separating an oil phase, drying the oil phase out, filtrating, obtaining a mixture of organopolysiloxane resin and volatile components;
(4.2) obtaining an organopolysiloxane resin after separating the volatile components by vacuum distillation.

17. The method for preparing organopolysiloxane resins of claim 16, wherein the vacuum distillation is carried out at a temperature of 100-160° C.

18. The method for preparing organopolysiloxane resins of claim 1, wherein a structure of the organopolysiloxane resin is one unit composition selected from the group consisting of: MQ resin, MT resin, DT resin, MDT resin, MTQ resin, DTQ resin, MDTQ resin, and MD resin.

* * * * *